United States Patent [19]

Duesbury

[11] 4,425,794

[45] Jan. 17, 1984

[54] LIQUID LEVEL INDICATOR

[75] Inventor: Paul G. Duesbury, Solihull, England

[73] Assignee: Lucas Industries Limited, Birmingham, England

[21] Appl. No.: 258,040

[22] Filed: Apr. 27, 1981

[51] Int. Cl.$^3$ .............................................. G01F 23/02
[52] U.S. Cl. ...................................... 73/293; 250/577
[58] Field of Search ...................... 73/293, 327, 290 R; 250/577; 116/227

[56] References Cited

U.S. PATENT DOCUMENTS

| | | | |
|---|---|---|---|
| 1,532,995 | 4/1925 | Gage | 116/227 X |
| 2,833,148 | 5/1958 | Hoyt et al. | 73/323 |
| 3,005,345 | 10/1961 | Kaufman et al. | 73/327 |
| 3,713,338 | 1/1973 | Kind | 73/293 |
| 4,355,238 | 10/1982 | Ruell | 73/293 |

FOREIGN PATENT DOCUMENTS 515938  12/1952  Belgium ................ 73/327

Primary Examiner—S. Clement Swisher
Assistant Examiner—John E. Chapman, Jr.
Attorney, Agent, or Firm—Holman & Stern

[57] ABSTRACT

A liquid level indicator which includes a plurality of pairs of optical fibers and a common carrier supporting at least an end portion of each fiber. The carrier is formed with an elongated passage into which, in use, liquid flows to a height dependent on the liquid level to be monitored. The end portions of each pair of fibers are separated by the passage and have their axes generally coextensive, while the end portions of adjacent pairs of fibers are spaced apart along the passage. The end surfaces of end portions of each pair of fibers are inclined at an acute angle to the axis of the fibers such that transmission of light from one fiber to the other is substantially prevented if the liquid does not fill the region of the passage between the fibers, while light is transmitted between the fibers if the region of the passage is filled with the liquid.

9 Claims, 1 Drawing Figure

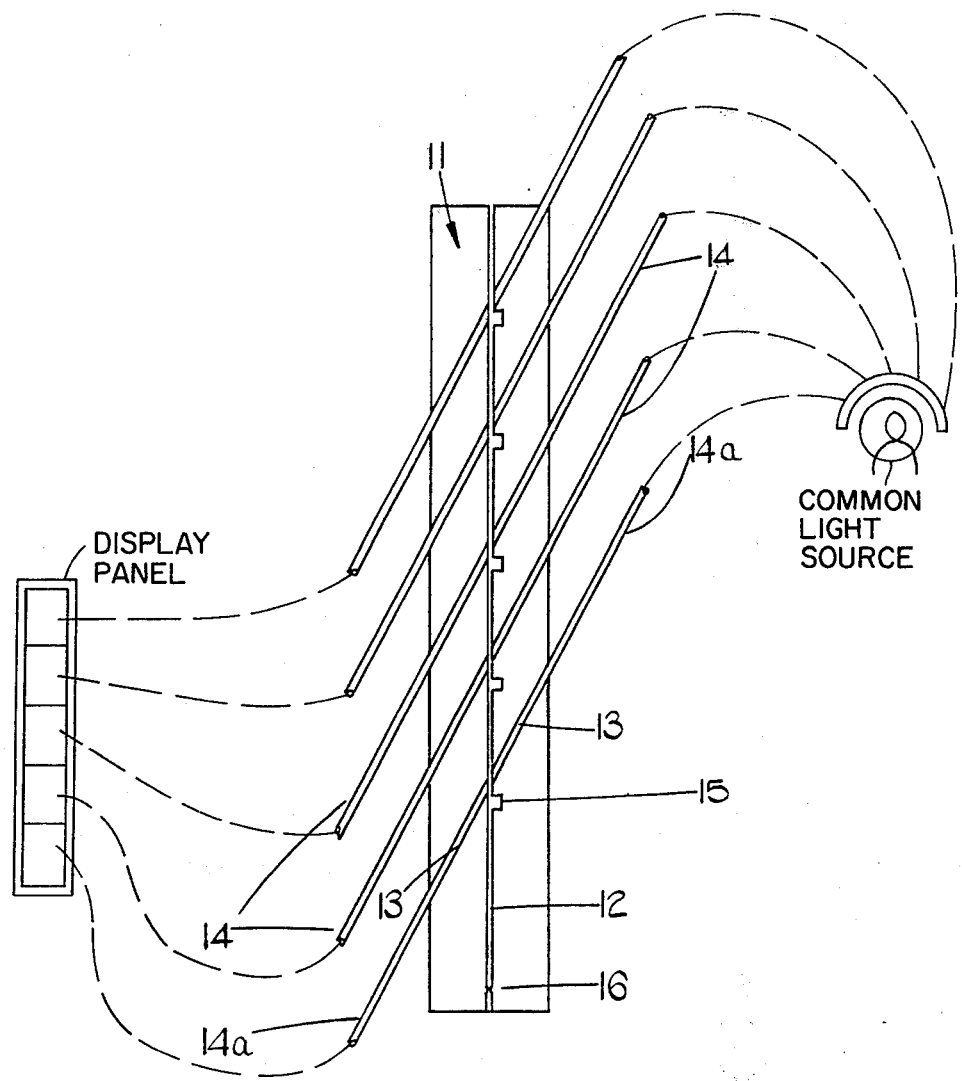

LIQUID LEVEL INDICATOR

BACKGROUND OF THE INVENTION

1. Field of the Invention

This invention relates to a liquid level indicator.

2. Description of the Prior Art

It is known from, for example, U.S. Pat. No. 3,272,174 to provide an indication of the liquid level in a tank by directing light onto the liquid surface from a light source positioned above the liquid level. The incident light is partly reflected from the surface of the liquid and a small proportion of the reflected light is intercepted by the ends of optical fibres located at different heights within the tank. Only those fibres which are positioned above the liquid surface are then illuminated to provide an indication of the liquid level.

In practice, however, the known device described in the preceding paragraph suffers from a number of disadvantages. In particular, the device produces a relatively low light output since the design of the device is such that much of the light from the light source is lost rather than being reflected into the optical fibres used to produce the display. Similarly, there is a tendency for light to be scattered by the internal walls of the tank thereby resulting in a low contrast ratio between the illuminated and non-illuminated display. Moreover, the arrangement of the device is such that the display in fact indicates how empty the tank is, since it will be appreciated from the preceding discussion that more output fibres are illuminated as the tank empties. Further, the device tends to produce a flickering output when used to monitor the liquid level in a moving tank such as, for example, a road vehicle fuel tank, as a result of agitation of the liquid in the tank.

An alternative method of liquid level detection, as disclosed in, for example, U.S. Pat. No. 3,120,125, involves transmitting light from a first optical fibre to a second optical fibre by total internal reflection at the dielectric interface between a transparent medium and the vapor above the liquid in a tank. When the liquid level rises above said interface, the higher refractive index of the liquid as compared with that of the vapor prevents the total internal reflection so that transmission of the light between the first and second optical fibres ceases. A plurality of separate pairs of said first and second optical fibres are mounted at varying heights respectively within the tank. However, although this arrangement produces an improved light output with less scatter than the device disclosed in U.S. Pat. No. 3,272,174, it still suffers from the disadvantages that it indicates how empty, rather than how full the tank is, and that it produces a flickering output when used to monitor the liquid level in a moving tank.

BRIEF SUMMARY OF THE INVENTION

An object of the present invention is therefore to overcome or alleviate the above-mentioned disadvantages experienced with conventional liquid level indicators.

Accordingly, the invention resides in a liquid level indicator including a plurality of pairs of optical fibres, and a respective support element associated with each pair of fibres for supporting at least an end portion of each of its associated pair of fibres. Each support element is formed with an elongated opening which in use receives the liquid. The end portions of the pair of fibres associated with the respective support element are separated by the opening and extend parallel with each other, the support elements being mounted, in use, so that their respective openings extend substantially vertically and so that the pairs of optical fibres are located at different heights corresponding to varying levels respectively of the liquid being monitored. The end surfaces of the end portions of each pair of fibres are inclined at an acute angle to the axis of the fibres such that transmission of light from one fibre to the other across the opening is substantially prevented if the liquid does not fill the region of the opening between the fibres, while light is transmitted between the fibres if said region of the opening is filled with the liquid.

In the liquid level indicator according to the invention, provided each opening is sufficiently narrow, it is possible to ensure that a substantial proportion of the incident light is transmitted between the fibres of each pair when the respective opening is filled with said liquid. Moreover, by suitable arrangement of the angle at which the end surface of each fibre is inclined to the fibre axis, it is possible to obtain a good contrast ratio between the transmitting and non-transmitting conditions of each pair of fibres, while at the same time ensuring that the brightness of the display obtained in the transmitting condition is sufficient for each observation. In addition, when the device of the invention is used to monitor the level of liquid in a tank, the number of pairs of fibres transmitting light increases as the liquid level increases and hence the device indicates how full, rather than how empty, the tank is.

Preferably, each opening is of increased dimensions directly below its associated pair of fibres. Increasing the dimensions of each opening in this way incorporates hysteresis into the device as the liquid level rises and falls, so that the effect of liquid agitation in a moving tank is reduced. Moreover, the provision of these increased dimension portions provides a sharper cut-off between the transmitting and non-transmitting conditions of each pair of fibres.

Preferably, the opening in the support element which in use is positioned lowermost is provided at its lower end with a reduced dimension portion to restrict flow of liquid into and out of the opening. The reduced dimension portion further reduces flicker of the output from the device when used to monitor the liquid level in a moving tank.

Preferably, the support elements form respective parts of a single carrier which is common for all the pairs of optical fibres and which is formed with a common passage along which said pairs of fibres are spaced.

Preferably, one fibre of each pair of fibres is positioned with its opposite end adjacent to a light source common for all of said one fibres, the other fibre of each pair being exposed at its opposite end in a respective window of a display panel.

BRIEF DESCRIPTION OF THE DRAWING

The accompanying drawing is a schematic cross-sectional view of part of a liquid level indicator according to one example of the present invention.

DETAILED DESCRIPTION

Referring to the drawing, the indicator includes an elongated carrier member 11 formed with a longitudinally extending, open-ended, closed-sided passage 12 which conveniently has a width of 0.58 mm. In use, when the indicator shown is used to monitor the liquid level in a tank, the carrier member 11 is located in the tank with its longitudinal axis extending vertically so that the liquid flows into the passage 12 to a height dependent on the liquid level in the tank. In view of the dimensions of the passage 12, the liquid rises in the passage above the liquid level in the tank by capillary action, but nevertheless rises and falls in accordance with the liquid level in the tank.

Supported by the carrier 11 is one end portion 13 of each of a plurality of optical fibres 14. The fibres 14 are arranged in pairs with the end portions 13 of each pair of fibres being separated by the passage 12 and having their axes substantially aligned and inclined at an acute angle to the longitudinal axis of the carrier 11. The end portions 13 of adjacent pairs of fibres 14 are spaced apart along the passage 12, with the spacing between adjacent pairs of portions 13 preferably being equal to or slightly greater than the capillary rise in the gap 12 of the liquid being monitored. The spacing between adjacent end portions 13 can be constant, or may be varied, over the length of the passage 12 depending on the requirements of the indicating system concerned. In the case of the lowermost pair 14a of fibres 14, it is important to ensure that the length of the passage 12 extending below the associated end portions 13 is greater than the capillary rise of the liquid in the passage.

The free end surface of each fibre portion 13 is polished after having been cut at an acute angle to the axis of the fibre so that said end surfaces of the fibres lie flush with the walls of the gap 12. The angle between the fibre axis and the end surface of the portion 13 is arranged so that, when there is no liquid in the region of the gap 12 between a respective pair of fibres 14 light flowing along one of the fibres is totally internally reflected at said end surface so that there is substantially no transmission of light to the other fibre. If, however, the region of the gap 12 between the fibres is filled with the liquid (having a higher refractive index than air), the angle of said surface is such that a much smaller proportion of the light is reflected so that a substantial proportion is transmitted to the other fibre. The factors which determine the angle required between the axis and the end surface of the fibre include the relative refractive indices of the fibre core, the fibre cladding, the liquid being monitored and the vapor above the liquid. For monitoring the level of petrol and turpentine, a suitable angle is about 22° C.

Each fibre is preferably formed of a synthetic resin material and typically has a diameter of 0.5 mm. Where synthetic resin fibres are used in a device for monitoring the level of petrol and similar liquids and where the fibres are bent after issuing from the carrier 11, it is found to be preferable to heat the bent fibres to relieve any stresses created by the bending operation. The fibres are then allowed to cool and set in their final configuration. This annealing step relieves any tendency of the fibres to exhibit crazing during prolonged use.

Formed in the walls of the gap 12 directly below each pair of fibre end portions 13 is a respective groove 15, the height (in the longitudinal direction of the gap 12) of which is arranged to exceed the capillary rise in the groove 15 in use. In the case of a petrol gauge, a suitable height for each groove 15 would be 1.5 mm, with its depth also suitably being 1.5 mm. The grooves 15 have the effect of increasing the change in the external liquid level required to cause the liquid in the gap 12 to rise above, or fall below, the region of the gap defined between a respective pair of fibre end portions 13. The incorporation of this hysteresis into the system has the advantage of reducing the tendency for a flickering output to be obtained when the liquid is agitated, such as is experienced in, for example, the petrol tank of a moving vehicle. The grooves 15 also provide a sharper cut-off between the transmitting and nontransmitting conditions of each pair of fibres.

At its end positioned lowermost in use, the gap 12 is provided with a reduced dimension portion 16 which has a width of 10-20 microns and defines a bleed orifice to restrict the flow of liquid into and out of the gap 12. This restriction of liquid flow further assists in reducing the tendency for the device to produce a flickering output when used to monitor the liquid level in a moving tank.

Each pair of optical fibres 14 is constituted by a light input fibre and a light output fibre. At its end remote from the portion 13, each input fibre is located adjacent a light source common for all the input fibres. In the case of a road vehicle petrol gauge, the light source would conveniently be a rear lamp of the vehicle, with a short focal length lens being interposed between the light bulb and the input fibres to focus the light onto the fibres and also act as a heat shield. Each of the output fibres is exposed at its end remote from the portion 13 in a respective window of the display panel. If necessary, each window could be provided with a simple expanding device to increase the illuminated area and alter the shape of each legend.

In the above example, the end portions 13 of each pair of fibres 14 are arranged so as to have their axes substantially aligned since the refractive index of the liquid whose level is to be indicated is similar to the refractive index of the fibres. If, however, the refractive index of the liquid to be monitored is less than that of the fibres, then due to refraction of the light passing from the transmitting fibre to the receiving fibre as it passes through the liquid, it is preferred to displace the two fibres so that their axes are not aligned in order to ensure that as much light as possible is received by the receiving fibre. In the arrangement shown in the drawing, this would involve displacing the right-hand fibres upwards with respect to the left-hand fibres.

I claim:

1. A liquid level indicator comprising at least one support element for a plurality of pairs of optical fibers, an elongated opening in said support element extending substantially vertically in use, a plurality of pairs of optical fibers supported at least at their end portions in substantially vertically spaced relationship in said support element with said end portions of each pair in parallel relationship and the end surfaces of said end portions of each pair of fibers being spaced by said opening, said end surface of each end portion being inclined at an acute angle with respect to the axis of said end portion and said end surfaces of each pair being parallel with respect to each other and substantially flush with the walls of said opening, so that when liquid, the level of which is being monitored, flows into said opening transmission of light from one fiber to the other fiber of each pair of fibers across said opening is substantially prevented if the liquid does not fill the region of said opening between said end surfaces of said pair of fibers and said light is transmitted if said region is filled with said liquid.

2. A liquid level indicator as claimed in claim 1, wherein said opening is enlarged in a region adjacent and below said end surfaces of said end portions of each pair of fibers.

3. A liquid level indicator as claimed in claim 1 or claim 2, wherein the opening in the support element is provided at its lower end with a reduced dimension portion to restrict flow of liquid into and out of the opening.

4. A liquid level indicator as claimed in claim 1 or 2, wherein the length of the opening below the end surfaces of the lowermost pair of end portions exceeds the capillary rise of the liquid in said opening.

5. A liquid level indicator as claimed in claim 1 or 2, wherein the spacing between adjacent pairs of fibers along the opening in said support element is at least equal to the capillary rise of the liquid in the opening and the spacing between the lowermost pair of fibers and the lower end of said opening is greater than said capillary rise.

6. A liquid level indicator as claimed in claim 1 or 2, wherein said support element comprises a single carrier which is common for all the pairs of optical fibers and wherein the elongated opening comprises a common passage along which said end portions of said pairs of fibers are spaced.

7. A liquid level indicator as claimed in claim 1 or 2, wherein each fiber is formed of a synthetic resin material.

8. A liquid level indicator as claimed in claim 1 or 2, wherein one fiber of each pair of fibers is positioned with its opposite end adjacent to a light source common for all of said one fibers, and the other fiber of each pair is exposed at its opposite end in a respective window of a display panel.

9. A liquid level indicator as claimed in claim 1 or 2, wherein the end portions of each pair of fibres have their axes substantially aligned.

* * * * *